April 15, 1975 A. A. MELINDER Re. 28,389

INDEXABLE BIT CUTTING TOOL HOLDER

Original Filed March 3, 1970

Arthur A. Melinder
INVENTOR

BY Jack W. Hayden
&
Richard E. Bee
ATTORNEYS

United States Patent

Re. 28,389

Reissued Apr. 15, 1975

28,389

INDEXABLE BIT CUTTING TOOL HOLDER

Arthur A. Melinder, deceased, late of Houston, Tex., by Betty Gene Melinder, executrix, 10006 Hanka, Houston, Tex. 77055

Original No. 3,672,016, dated June 27, 1972, Ser. No. 16,046, Mar. 3, 1970. Application for reissue July 30, 1973, Ser. No. 383,860, which is a continuation of abandoned application Ser. No. 295,245, Oct. 5, 1972

Int. Cl. B26d *1/00*

U.S. Cl. 29—96 10 Claims

Matter enclosed in heavy brackets [ ] appears in the original patent but forms no part of this reissue specification; matter printed in italics indicates the additions made by reissue.

ABSTRACT OF THE DISCLOSURE

An indexable bit cutting tool holder includes a shank which is provided with a recess at one end thereof for receiving an indexable bit cutting tool. A locking arrangement is provided for locking the indexable bit cutting insert or tool in position on the holder in a manner so that the bit cutting tool can be used to cut in more than one direction. The locking arrangement is such that a maximum surface contact inhibits loosening of the insert. An anvil is also provided on which the indexable bit cutting tool is adapted to be seated, the anvil having raised edges along one surface so that only the edges of the bit cutting tool are engaged and supported thereon to inhibit chipping or otherwise damaging the bit cutting tool.

This is a continuation of application Ser. No. 295,245, filed Oct. 5, 1972, now abandoned.

BACKGROUND OF THE INVENTION

The present invention relates to a tool holder and anvil for supporting and an indexable cutting tool insert in a firmly locked position on the tool holder. More particularly, the construction is such that the indexable cutting insert is moved from unlocked to locked position on the cutting tool holder by a rotating means, which rotation is translated into linear movement of the insert to lock it in position on the cutting tool holder.

The anvil upon which the bit cutting insert is seated is provided with a recess on one surface so that only the edge portions thereof engage the adjacent edges of the bit cutting insert to aid in more rigidly supporting the insert in position on the cutting tool holder and inhibiting chipping, breaking, or other damage to the insert.

Various types of indexable bit cutting tool holders have been heretofore provided wherein a pin is carried in an opening in the tool holder and fits within an opening in the insert, and by manipulation of the pin or other means associated therewith, movement of the insert is caused so as to lock it in position on the tool holder. All of the devices with which applicant is familiar are complicated in their operation and present certain disadvantages.

For example, some of the pins rotate or oscillate the insert into position which requires that the direction of locking of the insert be indicated by an arrow or other suitable means on the tool holder. Also, this type of arrangement does not permit a bit cutting insert to cut except in one direction on a piece of metal or the like.

Other forms of securing means have complicated mechanisms which do not provide sufficient rigidity in their arrangement to inhibit shattering of the insert when it engages the work piece. This may damage the work piece and cause chipping, breaking, or other damage to the insert or bit which in turn requires replacement of the insert and in some instances may damage the work piece before the damaged insert can be operatively disassociated therefrom.

Additionally, some forms of bit cutting inserts commonly employed are such as that shown in the patent to F. M. Franko, No. 3,187,406, wherein a raised center portion is provided with a groove around the edge of the insert to aid in turning and breaking the chip as it is cut from the piece with which the insert is engaged. When a flat anvil is employed with such insert, the outermost cutting edge of the insert is not supported, since there is a slight clearance between the edge of the insert and the anvil, and such construction is therefore disadvantageous in that it does not properly support the insert which may cause damage to the insert during use.

The present invention contemplates an anvil in combination with a tool holder, which anvil is provided with a recessed central portion and upstanding edges relative thereto so that only the edges of the bit cutting insert are engaged and supported immediately adjacent their contact with the work piece. This firmly and rigidly engages the cutting insert and tends to inhibit damage thereto which might otherwise occur where a clearance is present between the insert and its edges and the anvil.

The present invention overcomes all of the above and other disadvantages with tool holders for bit cutting inserts presently employed in that the pin which is mounted within a bore in the tool holder is rotatable therein, but this rotation is translated only into linear movement of the insert so that the insert is moved in a direction parallel to the longitudinal axis of the tool holder. This enables the bit cutting insert to make contact with and cut the work piece in more than one direction. Also, it tends to inhibit loosening of the bit cutting insert which may occur with those forms of devices wherein the bit cutting insert is locked by moving it in an arc rather than in a straight line as it is urged to locked position on the tool holder.

Another advantage of the present invention is that all components of the locking means including the anvil, the pin, and the surfaces of the tool holder upon which they are engaged are continuously in contact from unlocked to locked as well as in locked position so that a maximum of surface engagement of the locking means and tool holder and bit cutting insert is also present which also tends to inhibit unnecessary damage to the cutting insert during use.

The arrangement of the present invention also is such that the tool can be easily locked and unlocked to permit indexing of the cutting insert with a minimum of effort. Also, the anvil by supporting the insert only at its edges and immediately opposite the surface which normally engages the work piece provides additional strength and reinforcing to the bit cutting insert during operation.

DESCRIPTION OF THE PREFERRED EMBODIMENTS

Figure 1:
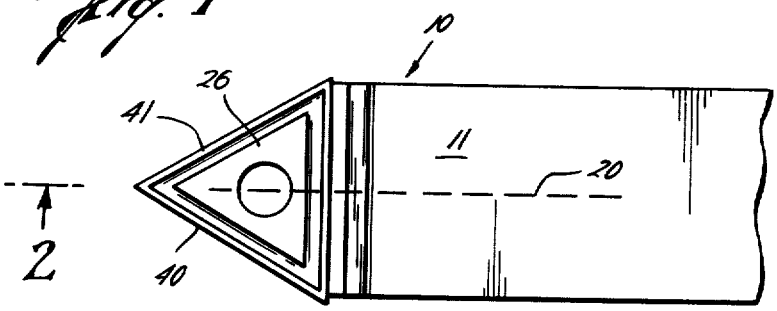
FIG. 1 is a plan view showing a preferred form of the present invention employed with a triangular shaped bit cutting insert.
Figure 4:
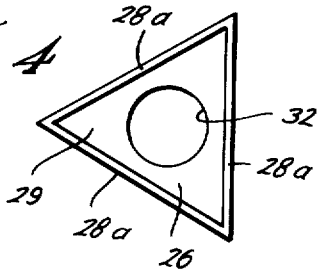
FIG. 4 is a plan view of one form of a cutting insert.

Attention is first directed to FIG. 1 wherein the tool holder of the present invention is referred to generally at 10 and is shown as including an elongated shank 11. A recess 13 is provided on one end of the shank as more clearly illustrated in FIG. 2 which defines a shoulder 14 that is spaced from and inclined toward the adjacent end 15 of the shank. A surface 16 extends from the bottom 17 of the shoulder 14 and is inclined toward and extends to the adjacent end 15 of the elongated shank 11. Preferably, the shoulder 14 is at substantially right angles relative to the surface 16 of the recess 13.

Figure 5:
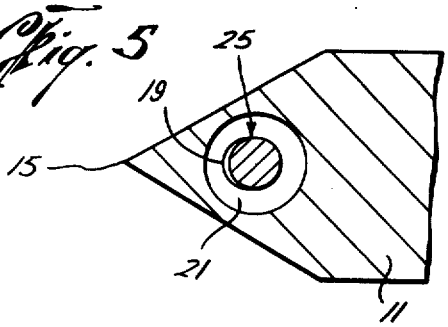
FIG. 5 is a sectional view on the line 5—5 of FIG. 2 to more clearly illustrate the elongation of the bore in the tool holder only in a longitudinal plane coincident with the longitudinal axis of the tool holder.

A cylindrical bore 18 extends through the tool holder 10 in the recess 13 and its longitudinal axis or center is coincident with the longitudinal axis 20 of the elongated shank 11 as illustrated in dotted line in FIG. 1 of the drawings. By referring to FIGS. 2 and 5, it can be seen that the cylindrical bore 18 is elongated along its longitudinal axis as illustrated at 19. The elongation is effected by drilling a hole within the cylindrical bore 18 from the surface 16 of the recess 13 at approximately 3 degrees relative to the longitudinal axis of the bore 18. Thus, the elongation is in a plane and coincident with the longitudinal axis 20 of the elongated tool holder 10 which translates a rotary motion of the pin referred to generally by the numeral 25 into linear motion of the bit cutting insert 26 as will be described.

Figure 2:
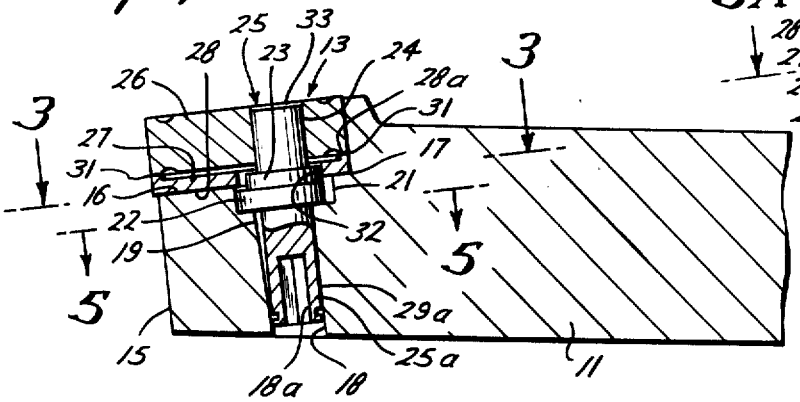
FIG. 2 is a sectional line on the line 2—2 of FIG. 1 showing the details of the recess adjacent the end of the tool holder, the bore, counterbore, anvil, cutting insert, and pin with the insert in locked position.
Figure 2A:
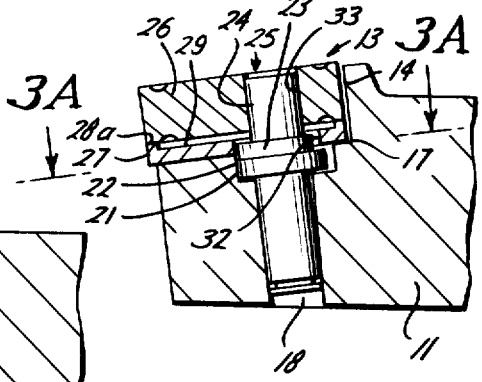
FIG. 2A illustrates the components of the present invention with the pin rotated and the insert in unlocked position.

A counterbore 21 extends from the surface 16 and is concentric with the bore 18 as shown in FIG. 2 and FIG. 2A of the drawings to form a seat for the cam 22 formed on the pin 25. An anvil 27 rests on the surface 16 as shown in FIGS. 2, 2A, and the anvil 27 is provided with a flat surface 28 which rests on the surface 16. As shown in FIG. 2 of the drawings, the edges 28a of the anvil 27 extend from the surface 28 and terminate in a common plane above the central recessed surface 29 to form seats for the opposite lands 31 of the cutting insert 26. As can be seen from the drawings, the lands 31 are provided on the bottom and top surfaces of the cutting insert 26, and when the insert 26 is supported on the anvil 27, it is supported only along its edges, as the recessed surface 29 is spaced from the bottom surface of the insert 26. The anvil 27 is provided with an opening 32 which is adapted to receive the additional cylindrical surface 23 immediately adjacent the cam 22 on the pin 25. The opening 32 may be slightly larger than the diameter of surface 23 as shown in the drawings to accommodate sliding movement of the anvil 27 on surface 16 as the anvil is moved to and away from locked position. A projection 24 extends upwardly from the surface 23 and into the opening 33 of the cutting insert 26 for moving the insert to and from locked position. A counterbore 18a in the lower end of the pin is shaped to receive a socket wrench.

It will be noted that the pin 25 is provided with a portion 25a which is of the same diameter, within machining limits, as the cylindrical bore 18. This portion extends from the cam surface 22 to the lower end of pin 25. It will be further noted that the portion 25a is of substantial longitudinal extent and is in contact with the cylindrical portion 29a of the opening 18a when the insert is in locked position as shown in FIG. 2. Thus, a substantial surface area of the pin, the bore 18, counterbore 21, cam surface 22, as well as the substantial area of the cylindrical projection 24 and a portion of the opening 33 are in contact when the insert is in locked position to aid in supporting it in locked position.

Figure 3:
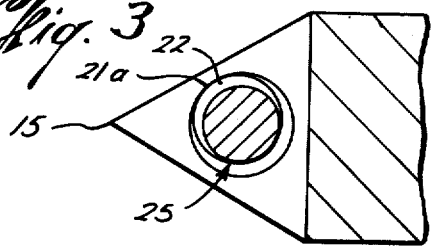
FIG. 3 is a sectional view on the line 3—3 of FIG. 2 to more clearly illustrate the relationship of the cam surface on the pin and its position in the counterbore when the pin is rotated to lock the insert on the tool holder.
Figure 3A:
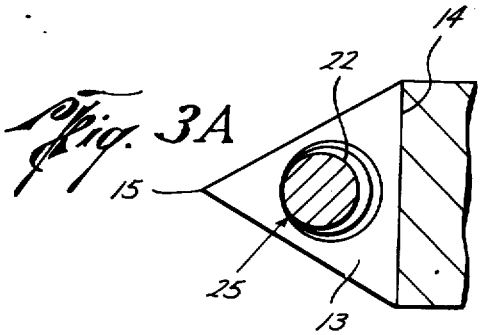
FIG. 3A is a sectional view on the line 3A—3A of FIG. 2A to illustrate the relationship of the cam surface on the pin when in full unlocked position.

When it is desired to move the cutting insert 26 from the unlocked position of FIG. 3A to the locked position of FIG. 2, a socket wrench may be engaged in the opening 18a to rotate the pin in either direction. When this occurs the cam surface 22 will move in the counterbore 21 and engage thereagainst. When it engages the wall of the counterbore as represented at 21a in FIG. 3, the insert 26 will be urged against the shoulder 14 and locked on the tool holder 10. As previously noted, there is a slight clearance between the additional cylindrical surface 23 and the opening 32 as well as between the projection 24 and opening 33 so that when the pin 25 is rotated to either lock or unlock the cutting insert in position on the tool holder 10, the surfaces 28 and 16 are always in sliding engagement.

FIG. 3A illustrates the relationship of the cam surface 22 of the pin 25 within the counterbore 21 when in full unlocked position.

The foregoing construction provides an arrangement which translates rotary motion of the pin 25 into linear movement of the anvil 27 and cutting insert 26 to lock the insert and anvil against the shoulder 14 and also to unlock them from the shoulder 14. Also, since the surfaces 28, 16, 28a, and 31 are always in contact, there is no relative tilting of the components of the locking mechanism or of the insert 26 when moving it from locked to unlocked position or when moving it from unlocked to locked position. As can be seen, the construction enables the insert 26 to be readily unlocked from the tool holder and turned over or another insert applied as may be desired with a minimum of effort.

Also, since the pin 25 locks in a linear direction and since it can be locked in either direction with equal ease, either the side as shown in FIG. 1 at 40 or the side in 41 may be alternately used as the cutting edge without disturbing the relationship of the locking members or the cutting insert 26. This is particularly advantageous since it becomes unnecessary to indicate on the tool holder 10 in which direction it should be rotated for locking of the cutting insert, and it also eliminates the disadvantage of having the insert become loose should it be locked in one direction and then a cut taken in another direction which might unlock the insert, as is possible with devices of the prior art.

The present invention has been described in detail for purposes of explanation only, wherein the indexable bit cutting tool, or cutting insert 26 is triangular in configuration. In such event the recess 13 on the end of shank 14 is of similar configuration, and the shoulder 14 is as shown to provide support and contact for the insert 26 when seated thereagainst.

However, the invention can be employed in connection with an insert of any configuration. For example, if the insert 26 is round, then the recess 13 on the end of the shank will be of configuration to receive a round insert 26. Also, the shoulder 14 will be arcuate. Similarly, for different cutting geometries, it may be desirable to have a bit 26 that is square, or polygonal, or a parallelogram. In all of such instances, the recess 13 on the end of the shank, and the end of the shank as well as shoulder 14 are arranged and are contoured to receive whatever configuration insert may be desired. All are within the scope of the present invention.

The foregoing disclosure and description of the invention are illustrative and explanatory thereof, and various changes in the size, shape, and materials as well as in the details of the illustrated construction may be made within the scope of the appended claims without departing from the spirit of the invention.

What is claimed is:

1. An indexable bit cutting tool holder comprising:

(a) an elongated shank;

(b) there being a recess on one end of said shank which defines *a support surface and* a shoulder spaced from [and inclined toward] the adjacent end of said shank [and a support surface inclined from the bottom of said inclined shoulder toward the adjacent end of said shank];

(c) there being a cylindrical bore extending *into* [through] said shank in the recess, said bore being elongated along its longitudinal axis;

(d) said cylindrical bore including a counterbore concentric therewith which intersects said support surface;

(e) pin means having substantially the same diameter as the cylindrical bore and rotatable therein;

(f) a cam surface on said pin means for fitting in the counterbore; and (g) a cylindrical projection on said pin means engageable with the indexable bit cutting tool *when said cam surfaces engages said counterbore upon rotation of said pin means whereby the* [for linearly moving the] indexable bit cutting tool *is moved* against said [inclined] shoulder *means* and [locking the bit cutting tool] *locked* in the recess [when said pin is rotated in the cylindrical bore].

[2. The invention of claim 1 wherein said bore is elongated along its longitudinal axis toward the adjacent end of said shank.]

3. The invention of claim 1 wherein the adjacent end of said shank is generally triangular in configuration and the indexable cutting bit is also generally triangular in configuration with one edge thereof abutting said [inclined] shoulder and the other two edges exposed for cutting when [said pin means locks] the bit *is locked* in the recess.

4. The invention of claim 1 including:

(a) an additional cylindrical surface on said pin adjacent said cam *surface*;

(b) an anvil having an opening to receive the additional cylindrical surface of said pin, said anvil supporting the indexable bit cutting tool.

*5. An indexable bit cutting tool holder comprising:*

*(a) an elongated shank;*

*(b) there being a recess on one end of said shank which defines shoulder means and a support surface;*

*(c) there being a cylindrical bore extending into said shank in the recess and an elongated space joining said bore on one side;*

*(d) said cylindrical bore including a counterbore which intersects said support surface;*

*(e) pin means having substantially the same diameter as the cylindrical bore and rotatable therein;*

*(f) an eccentric cam means on said pin means for fitting in the counterbore; and*

*(g) a projection on said pin means engageable with the indexable bit cutting tool when said cam means engages said counterbore upon rotation of said pin means whereby the indexable bit cutting tool is moved against said shoulder means and locked in the recess.*

*6. The invention of claim 5 wherein said bore and said elongated space combine to form an opening having, in perpendicular cross-section with respect to the axis of the bore, an oval configuration.*

*7. The invention of claim 5 wherein the longitudinal axis of said elongated space is inclined with respect to the longitudinal axis of said bore.*

*8. The invention of claim 5 wherein the longitudinal axis of said elongated space is inclined approximately 3° with respect to the longitudinal axis of said bore.*

*9. The invention of claim 5 wherein said elongated space extends along said bore for substantially the entire distance that said pin means extends into said bore.*

*10. The invention of claim 5 wherein said eccentric cam means comprises a cylindrical element eccentrically disposed with respect to the axis of said pin means.*

*11. The invention of claim 5 including only a single elongated space joining said bore on only one side.*

References Cited

The following references, cited by the Examiner, are of record in the patented file of this patent or the original patent.

UNITED STATES PATENTS

| | | | |
|---|---|---|---|
| 3,341,920 | 9/1967 | Kelm | 29—96 |
| 3,310,859 | 3/1967 | Diemond et al. | 29—96 |
| 3,525,136 | 8/1970 | Crosby | 29—96 |
| 3,491,421 | 1/1970 | Holloway | 29—96 |
| 3,299,489 | 1/1967 | Pohle | 29—96 |
| 3,137,059 | 6/1964 | Hertel | 29—96 |
| 3,146,656 | 9/1964 | Richards | 29—96 X |
| 1,838,520 | 12/1931 | Archer | 29—98 |

HARRISON L. HINSON, Primary Examiner

UNITED STATES PATENT OFFICE

CERTIFICATE OF CORRECTION

Patent No. Reissue 28,389 Dated April 15, 1975

Inventor(s) Arthur A. Melinder, deceased, late of Houston, Texas
by Betty Gene Melinder, executrix, Houston, Texas It is certified that error appears in the above-identified patent and that said Letters Patent are hereby corrected as shown below:

Col. 1, line 39, after "supporting" delete --and--.

Col. 5, line 16, "surfaces" should be --surface--.

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*